(12) United States Patent
Nakatani

(10) Patent No.: US 10,133,521 B2
(45) Date of Patent: Nov. 20, 2018

(54) SERVER DEVICE, RECORDING MEDIUM, AND INFORMATION PROCESSING SYSTEM

(71) Applicant: KYOCERA DOCUMENT SOLUTIONS INC., Osaka (JP)

(72) Inventor: Ryusuke Nakatani, Osaka (JP)

(73) Assignee: KYOCERA DOCUMENT SOLUTIONS INC., Osaka (JP)

(*) Notice: Subject to any disclaimer, the term of this patent is extended or adjusted under 35 U.S.C. 154(b) by 0 days.

(21) Appl. No.: 15/863,818

(22) Filed: Jan. 5, 2018

(65) Prior Publication Data

US 2018/0196625 A1 Jul. 12, 2018

(30) Foreign Application Priority Data

Jan. 10, 2017 (JP) .................................. 2017-001551

(51) Int. Cl.
*H04N 1/58* (2006.01)
*G06F 3/12* (2006.01)
*H04N 1/00* (2006.01)

(52) U.S. Cl.
CPC .......... *G06F 3/1213* (2013.01); *G06F 3/1226* (2013.01); *G06F 3/1288* (2013.01); *H04N 1/0023* (2013.01); *H04N 2201/0094* (2013.01)

(58) Field of Classification Search
USPC ................. 358/1.1–3.29, 1.11–1.18, 520–532
See application file for complete search history.

(56) References Cited

U.S. PATENT DOCUMENTS

| | | | | |
|---|---|---|---|---|
| 8,134,587 B2* | 3/2012 | Niu | ......................... | H04N 7/147 348/14.09 |
| 9,207,898 B2* | 12/2015 | Cogan | .................... | G06F 3/1212 |
| 9,307,115 B2* | 4/2016 | Hasegawa | ............ | H04N 1/3876 |
| 9,591,178 B2* | 3/2017 | Matsuda | ............ | H04N 1/40068 |
| 2009/0174894 A1* | 7/2009 | Kamijo | ................. | G06F 21/608 358/1.15 |
| 2009/0201515 A1 | 8/2009 | Kiuchi | | |
| 2012/0236159 A1* | 9/2012 | Tamura | ............. | H04N 1/00164 348/207.1 |
| 2017/0295285 A1* | 10/2017 | Yoshida | ............... | H04N 1/0023 |

FOREIGN PATENT DOCUMENTS

| | | |
|---|---|---|
| JP | 2004-086692 A | 3/2004 |
| JP | 2009-194563 A | 8/2009 |

* cited by examiner

*Primary Examiner* — Marcellus Augustin
(74) *Attorney, Agent, or Firm* — Li & Cai Intellectual Property (USA) Office

(57) ABSTRACT

A server device obtains printable data from a terminal device; generates intermediate data on a basis of the printable data; supplies the intermediate data to the plurality of image forming apparatuses recorded in the resolution table; obtains a plurality of rasterized data depending on the different resolutions, the plurality of rasterized data being generated on a basis of the intermediate data by the plurality of image forming apparatuses; accepts a pull-print request from a pull-print image forming apparatus and obtains a pull-print resolution, the pull-print image forming apparatus being an image forming apparatus that executes pull-print, the pull-print resolution being a resolution of the pull-print image forming apparatus; determines whether a resolution same as the pull-print resolution is recorded in the resolution table or not; and supplies rasterized data to the pull-print image forming apparatus, the rasterized data depending on the resolution the same as the pull-print resolution.

5 Claims, 8 Drawing Sheets

SERVER DEVICE, RECORDING MEDIUM, AND INFORMATION PROCESSING SYSTEM

CROSS REFERENCE TO RELATED APPLICATION

This application claims the benefit of Japanese Priority Patent Application JP 2017-001551 filed Jan. 10, 2017, the entire contents of which are incorporated herein by reference.

BACKGROUND OF THE INVENTION

1. Field of the Invention

The present disclosure relates to a server device that supplies data for forming an image to an image forming apparatus, a non-transitory computer readable recording medium that records a program, and an information processing system.

2. Description of Related Art

There is known an image forming apparatus capable of obtaining data from a server device and forming (so-called pull-printing) an image.

It is desirable for an image forming apparatus to obtain data from a server device and to form an image in a shorter time.

SUMMARY OF THE INVENTION

According to an embodiment of the present disclosure, a server device includes:

a storage that stores a resolution table, the resolution table recording a plurality of image forming apparatuses having different resolutions and the different resolutions in association with each other;

a memory that stores an information processing program; and a processor that executes the information processing program, in which when the processor executes the information processing program, the processor operates as a printable data obtaining unit that obtains printable data from a terminal device, an intermediate data generating unit that generates intermediate data on a basis of the printable data, the intermediate data being independent of a resolution, an intermediate data supplying unit that supplies the intermediate data to the plurality of image forming apparatuses recorded in the resolution table, a rasterized data obtaining unit that obtains a plurality of rasterized data depending on the different resolutions, the plurality of rasterized data being generated on a basis of the intermediate data by the plurality of image forming apparatuses, a pull-print accepting unit that accepts a pull-print request from a pull-print image forming apparatus and obtains a pull-print resolution, the pull-print image forming apparatus being an image forming apparatus that executes pull-print, the pull-print resolution being a resolution of the pull-print image forming apparatus, a resolution determining unit that determines whether a resolution same as the pull-print resolution is recorded in the resolution table or not, and a pull-print data supplying unit that supplies rasterized data to the pull-print image forming apparatus, the rasterized data depending on the resolution the same as the pull-print resolution.

According to an embodiment of the present disclosure, a non-transitory computer readable recording medium records an information processing program, the information processing program causing a computer including a storage that stores a resolution table, the resolution table recording a plurality of image forming apparatuses having different resolutions and the different resolutions in association with each other, to operate as:

a printable data obtaining unit that obtains printable data from a terminal device;

an intermediate data generating unit that generates intermediate data on a basis of the printable data, the intermediate data being independent of a resolution;

an intermediate data supplying unit that supplies the intermediate data to the plurality of image forming apparatuses recorded in the resolution table;

a rasterized data obtaining unit that obtains a plurality of rasterized data depending on the different resolutions, the plurality of rasterized data being generated on a basis of the intermediate data by the plurality of image forming apparatuses;

a pull-print accepting unit that accepts a pull-print request from a pull-print image forming apparatus and obtains a pull-print resolution, the pull-print image forming apparatus being an image forming apparatus that executes pull-print, the pull-print resolution being a resolution of the pull-print image forming apparatus;

a resolution determining unit that determines whether a resolution same as the pull-print resolution is recorded in the resolution table or not; and a pull-print data supplying unit that supplies rasterized data to the pull-print image forming apparatus, the rasterized data depending on the resolution the same as the pull-print resolution.

According to an embodiment of the present disclosure, an information processing system includes:

a plurality of image forming apparatuses having different resolutions; and a server device including a storage that stores a resolution table, the resolution table recording the plurality of image forming apparatuses and the different resolutions in association with each other, a memory that stores an information processing program, and a processor that executes the information processing program, in which when the processor executes the information processing program, the processor operates as a printable data obtaining unit that obtains printable data from a terminal device, an intermediate data generating unit that generates intermediate data on a basis of the printable data, the intermediate data being independent of a resolution, an intermediate data supplying unit that supplies the intermediate data to the plurality of image forming apparatuses recorded in the resolution table, a rasterized data obtaining unit that obtains a plurality of rasterized data depending on the different resolutions, the plurality of rasterized data being generated on a basis of the intermediate data by the plurality of image forming apparatuses, a pull-print accepting unit that accepts a pull-print request from a pull-print image forming apparatus and obtains a pull-print resolution, the pull-print image forming apparatus being an image forming apparatus that executes pull-print, the pull-print resolution being a resolution of the pull-print image forming apparatus, a resolution determining unit that determines whether a resolution same as the pull-print resolution is recorded in the resolution table or not, and a pull-print data supplying unit that supplies rasterized data to the pull-print image forming apparatus, the rasterized data depending on the resolution the same as the pull-print resolution.

These and other objects, features and advantages of the present disclosure will become more apparent in light of the following detailed description of best mode embodiments thereof, as illustrated in the accompanying drawings.

DETAILED DESCRIPTION OF THE PREFERRED EMBODIMENTS

Hereinafter, an embodiment of the present disclosure will be described with reference to the drawings.

1. OVERVIEW OF INFORMATION PROCESSING SYSTEM

Figure 1:
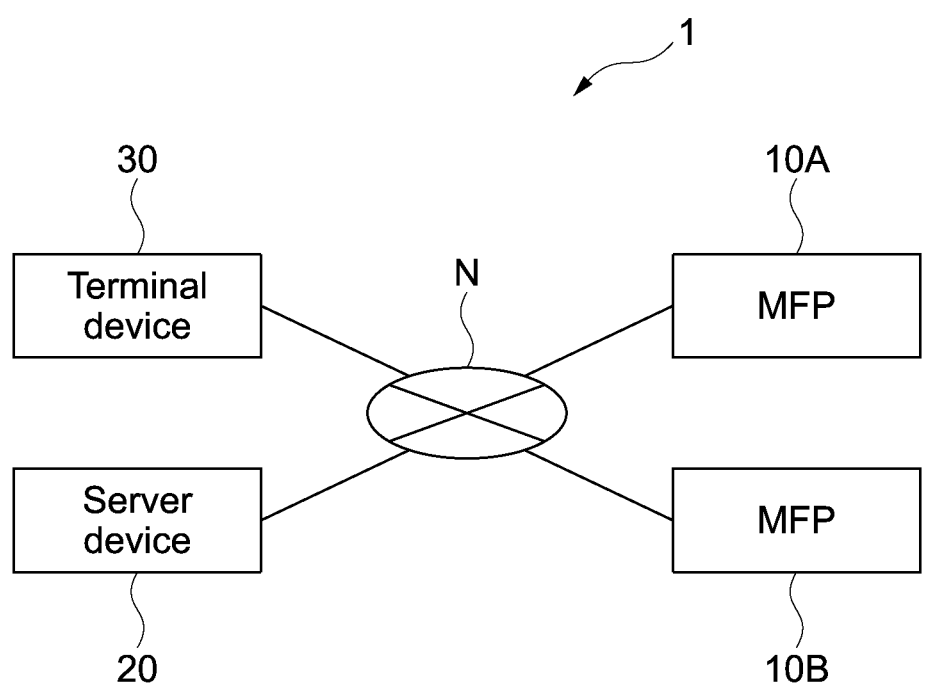
FIG. 1 shows an information processing system according to an embodiment of the present disclosure.

FIG. 1 shows an information processing system according to an embodiment of the present disclosure.

The information processing system 1 includes, the image forming apparatuses (Multifunction Peripherals, hereinafter referred to as MFPs) 10A, 10B . . . , and the server device 20, and the terminal device 30. The MFPs 20A, 20B . . . can communicate with the server device 30 via the network N. The network N is, for example, an in-office LAN (Local Area Network).

In the description of the present example, the information processing system 1 includes the two MFPs 10A, 10B. The MFPs 10A, 10B may be different models and may have different specs. In this example, the MFPs 10A, 10B have different resolutions. In the following description, the two MFPs 10A and 10B are simply referred to as the MFP(s) 10 where it is not necessary to distinguish between them.

The terminal device 30 is an information processing apparatus such as a personal computer. The terminal device 30 can communicate with at least the server device 20 via the network N or without the network N. In the present example, the terminal device 30 can communicate with the server device 20 via the network N.

A user wants to print printable data generated by the terminal device 30 by using any one MFP 10 connected to the network N. The terminal device 30 is operated by the user, and supplies the printable data to the server device 20. The user logs in to any one MFP 10. The MFP 10, to which the user logs in, obtains intermediate data or rasterized data generated on a basis of the printable data from the server device 20. The MFP 10 forms an image on a basis of the intermediate data or the rasterized data (so-called pull-print).

The printable data is generated by the terminal device 30 by executing a printer driver, and described in Page Description Language. The printable data (strictly speaking, header of printable file storing printable data) describes a resolution for printing the printable data.

The intermediate data independent of a resolution means data immediately before generating rasterized data. The intermediate data is generated by interpreting (analyzing) and converting printable data by the server device 20, and is used only to generate rasterized data. In other words, the resolution of an image to be output is yet to be reflected to the intermediate data. The intermediate data also describes the resolution for printing the intermediate data (the resolution being the same value as the resolution described in the printable data).

The rasterized data is generated by converting intermediate data by the MFP 10. The rasterized data is to be actually output to a printer engine. The rasterized data depending on a resolution means bitmap data or the like. In principle, the resolution of rasterized data depends on the resolution described in the printable data and the intermediate data. However, where the resolution of the MFP 10 that generates rasterized data is lower than the resolution described in the printable data and the intermediate data, the resolution of the rasterized data has no choice but to depend on the resolution of the MFP 10.

2. HARDWARE CONFIGURATION OF IMAGE FORMING APPARATUS

Figure 2:
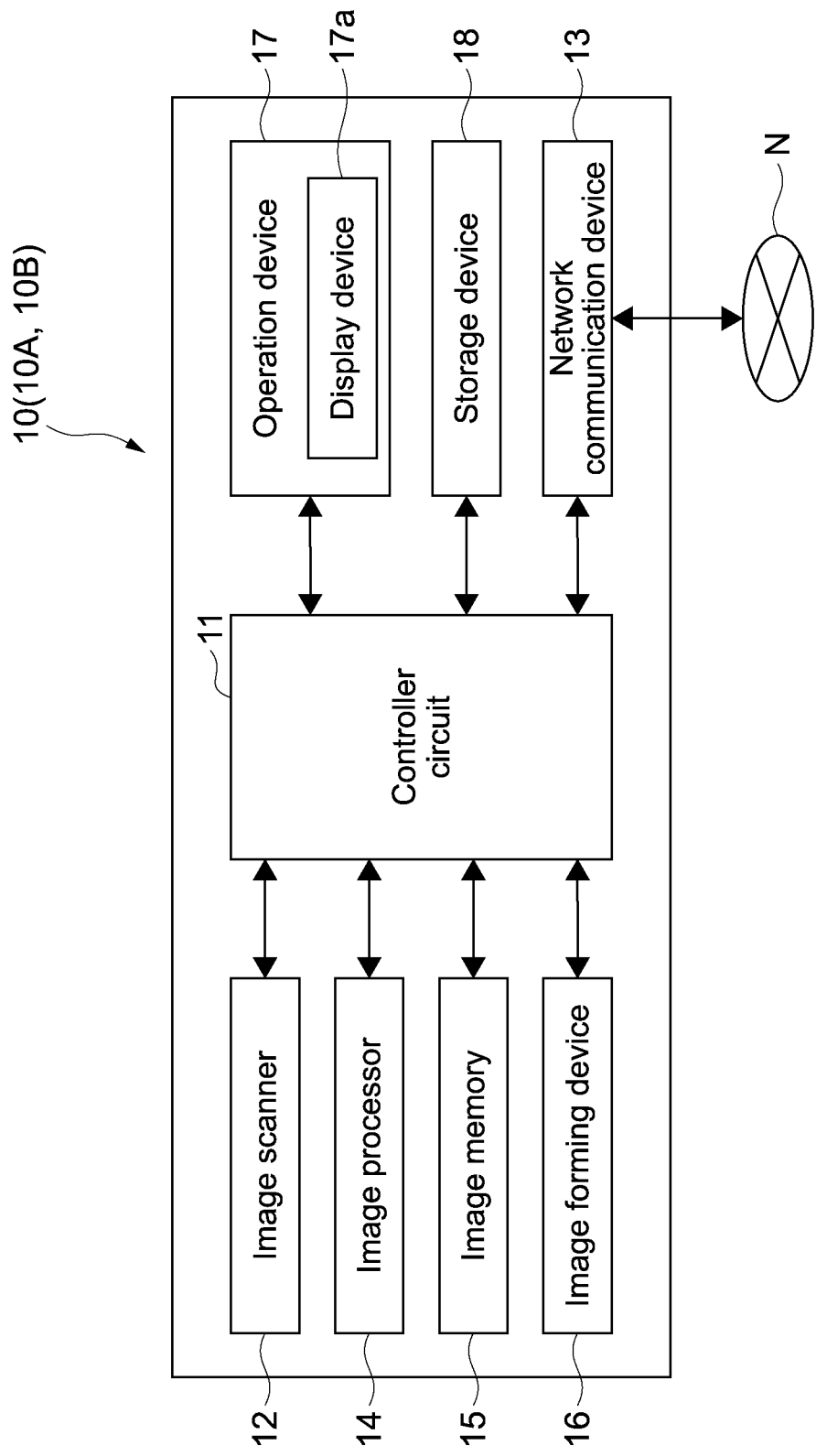
FIG. 2 shows a hardware configuration of an image forming apparatus.

FIG. 2 shows a hardware configuration of an image forming apparatus.

The MFP 10 includes the controller circuit 11. The controller circuit 11 includes a CPU (Central Processing Unit), a RAM (Random Access Memory), a ROM (Read Only Memory), dedicated hardware circuits, and the like, and controls the entire operations of the MFP 10. Computer programs causing the MFP 10 to operate as the respective functional units (described later) are stored in a non-transitory computer readable recording medium such as a ROM.

The controller circuit 11 is connected to the image scanner 12, the image processor 14, the image memory 15, the image forming device 16, the operation device 17, the storage device 18, the network communication device 13, and the like. The controller circuit 11 controls operations of the aforementioned devices connected thereto, and sends/receives signals/data to/from the devices.

The controller circuit 11 receives instructions to execute jobs input from the operation device 17 or from a personal computer (not shown) connected to the network N by a user. In response to the instructions, the controller circuit 11 controls to drive and process the mechanisms necessary to control operations of functions such as scanner functions, printing functions, and copying functions.

The image scanner 12 captures an image from a script.

The image processor 14 processes image data of the image captured by the image scanner 12 as necessary. For example, the image processor 14 processes the image (e.g., corrects shading of the image) captured by the image scanner 12 in order to improve the quality of an image to be formed.

The image memory 15 has an area for temporarily storing data of the image of the script captured by the image scanner 12, and an area for temporarily storing data to be printed by the image forming device 16.

The image forming device 16 (image forming circuit) forms an image of, for example, the image data captured by the image scanner 12.

The operation device 17 includes a touch panel device and operation key devices that accept instructions input by a user about various operations and processes that the MFP 10 can execute. The touch panel device includes the display device 17a such as a LCD (Liquid Crystal Display) and an organic EL (Electroluminescence) display including a touch panel.

The communication control device 13 is an interface to be connected to the network N.

The storage device 18 is a large-volume storage device such as a HDD (Hard Disk Drive) that stores, for example, the script image captured by the image scanner 12.

3. HARDWARE CONFIGURATION OF SERVER DEVICE

Figure 3:
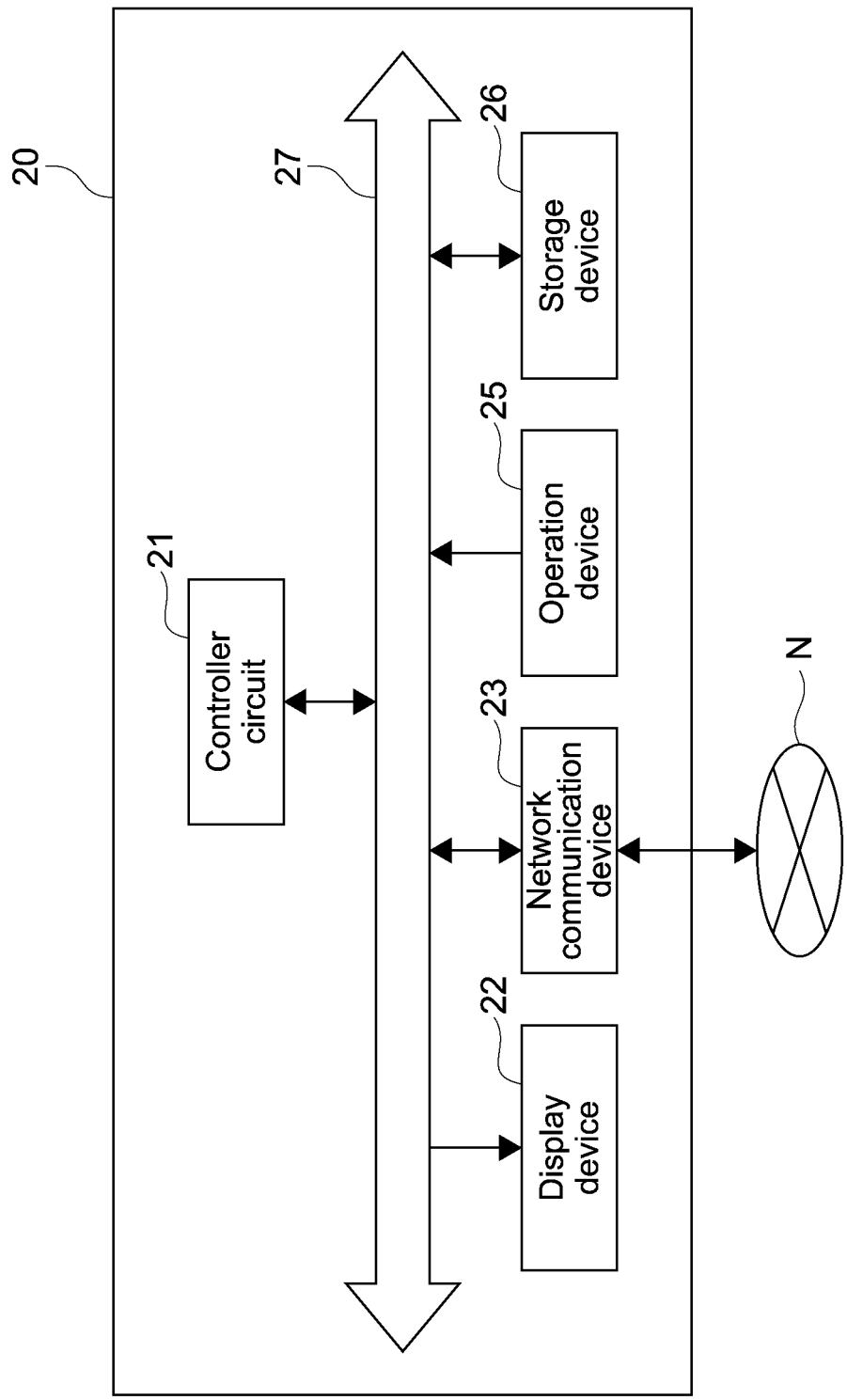
FIG. 3 shows a hardware configuration of a server device.

FIG. 3 shows a hardware configuration of a server device.

The server device 20 includes the controller circuit 21. The server device 20 further includes the display device 22, the network communication device 23, the operation device 25, and the storage device 26 connected to the controller circuit 21 via the bus 27.

The controller circuit 21 includes a CPU and the like. The CPU of the controller circuit 21 loads programs recorded in the ROM in the RAM to execute the programs, the ROM being an example of a non-transitory computer readable recording medium. One of the programs is a printer driver. The controller circuit 21 loads the printer driver recorded in the ROM in the RAM to execute the printer driver to thereby drive the MFP connected to the network N, the ROM being an example of a non-transitory computer readable recording medium.

The storage device 26 includes the ROM, the RAM, and a large-volume storage device such as an HDD. The non-volatile ROM stores the programs executed by the controller circuit 21, data, and the like. The programs stored in the ROM are loaded in the RAM.

The display device 22 includes an LCD, an organic EL display, or the like. The display device 22 executes computing on a basis of information received from the controller circuit 21, and displays generated image signals on the display. The display device 22 may be an external display device.

The operation device 25 includes a keyboard, a mouse, various switches, and the like. The operation device 25 detects operations input by a user, and outputs information to the controller circuit 21.

The network communication device 23 is an interface for connecting to the network N.

4. HARDWARE CONFIGURATION OF TERMINAL DEVICE

The terminal device 30 is a typical information processing apparatus such as a personal computer a tablet terminal, and a smartphone. The terminal device 30 may include large-volume storage devices (HDD (Hard Disk Drive), SSD (Solid State Drive), etc.). The hardware configuration thereof will not be shown. The CPU of the terminal device 30 loads programs stored in the ROM into the RAM and executes the programs. The terminal device 30 supplies printable data to the server device 20 via the network N.

5. FUNCTIONAL CONFIGURATION OF INFORMATION PROCESSING SYSTEM

Figure 4:
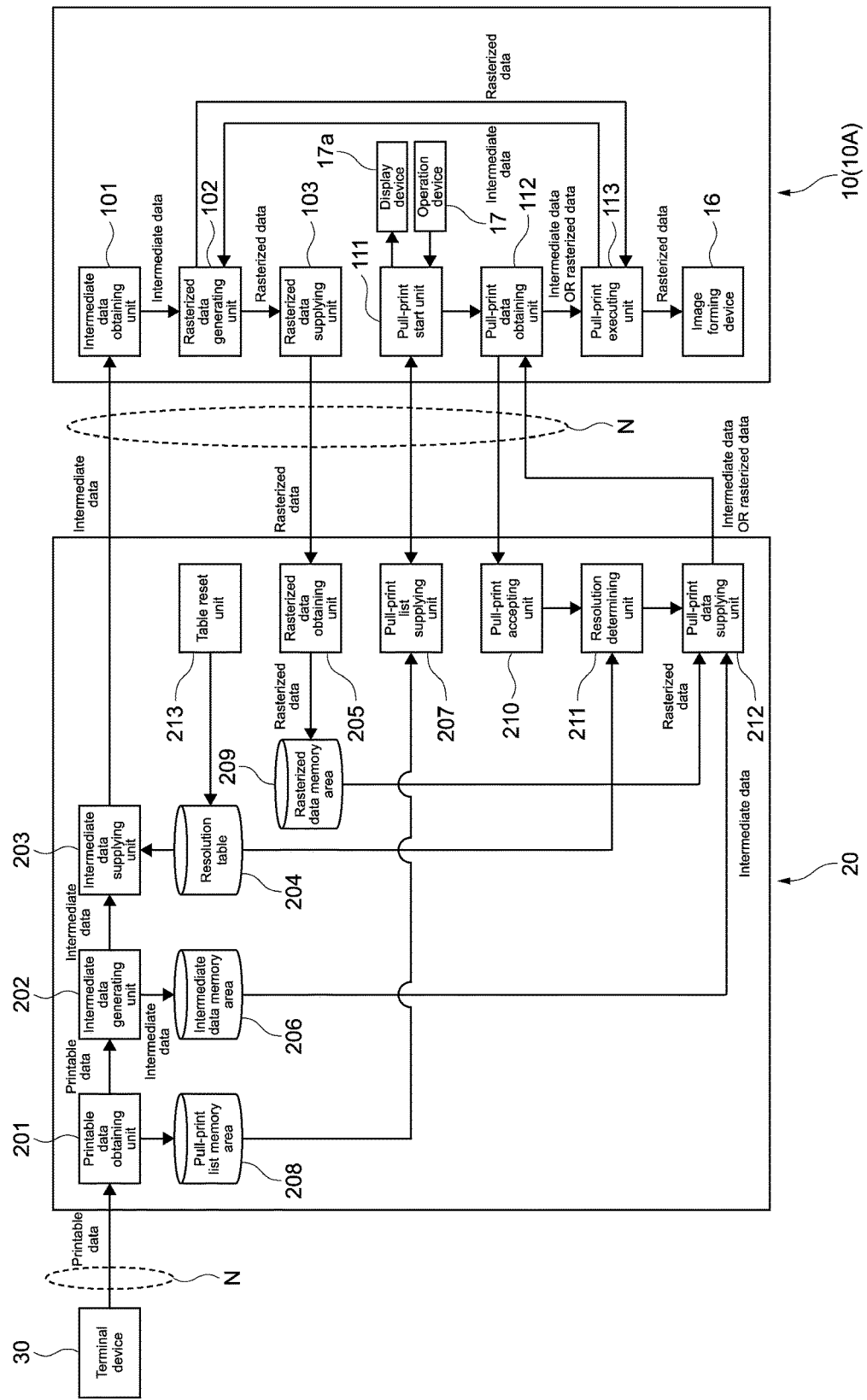
FIG. 4 a functional configuration of the information processing system.

FIG. 4 shows a functional configuration of the information processing system.

Hereinafter, an MFP that executes pull-print will be referred to as "pull-print MFP". In this example, the "pull-print MFP" is the MFP 10A, which will be referred to as the pull-print MFP 10A. Further, the resolution of the pull-print MFP 10A will be referred to as "pull-print resolution".

The CPU (processor) of the server device 20 loads an information processing program recorded in the ROM in the RAM to execute the information processing program, the ROM being an example of a non-transitory computer readable recording medium, to thereby operate as the printable data obtaining unit 201, the intermediate data generating unit 202, the intermediate data supplying unit 203, the rasterized data obtaining unit 205, the pull-print list supplying unit 207, the pull-print accepting unit 210, the resolution determining unit 211, the pull-print data supplying unit 212, and the table reset unit 213.

The HDD (storage) of the server device 20, the HDD being an example of a storage device, includes a memory area for the resolution table 204, the intermediate data memory area 206, the pull-print list memory area 208, and the rasterized data memory area 209.

The MFP 10 loads an information processing program recorded in the ROM in the RAM to execute the information processing program, the ROM being an example of a non-transitory computer readable recording medium, to thereby operate as the intermediate data obtaining unit 101, the rasterized data generating unit 102, the rasterized data supplying unit 103, the pull-print start unit 111, the pull-print data obtaining unit 112, and the pull-print executing unit 113.

The terminal device 30 supplies printable data to the server device 20 via the network N.

The printable data obtaining unit 201 of the server device 20 obtains printable data from the terminal device 30 via the network N. The printable data obtaining unit 201 records the identifier information (name, etc.) of the printable data in the pull-print list memory area 208 as a list of data-that-can-be-pull-printed.

The intermediate data generating unit 202 of the server device 20 interprets the printable data obtained from the terminal device 30, and generates intermediate data independent of a resolution.

The intermediate data supplying unit 203 of the server device 20 supplies the intermediate data to all the MFPs 10A and 10B (FIG. 4 shows only one MFP) recorded in the resolution table 204 via the network N, and requests to generate rasterized data on a basis of the intermediate data.

The intermediate data obtaining unit 101 of the MFP 10 obtains intermediate data from the server device 20 via the network N, and receives a request to generate rasterized data on a basis of the intermediate data.

The rasterized data generating unit 102 of the MFP 10 generates rasterized data depending on the resolution of the MFP 10 on a basis of the intermediate data obtained from the server device 20.

The rasterized data supplying unit 103 of the MFP 10 supplies the rasterized data generated by the rasterized data generating unit 102 to the server device 20 via the network N.

The rasterized data obtaining unit 205 of the server device 20 obtains a plurality of rasterized data depending on the resolutions of the MFPs 10A and 10B from all the MFPs 10A and 10B recorded in the resolution table 204 via the network N. The rasterized data obtaining unit 205 records the plurality of rasterized data depending on the different resolution obtained from the MFPs 10 in the rasterized data memory area 209.

The pull-print start unit 111 of the pull-print MFP 10A requests the server device 20 for a list of data-that-can-be-pull-printed via the network N.

The pull-print list supplying unit 207 of the server device 20 accepts the request for a list of data-that-can-be-pull-printed from the pull-print MFP 10A via the network N. The pull-print list supplying unit 207 supplies the list of data-that-can-be-pull-printed recorded in the pull-print list memory area 208 to the pull-print MFP 10A via the network N.

The pull-print start unit 111 of the pull-print MFP 10A obtains the list of data-that-can-be-pull-printed from the server device 20 via the network N. The pull-print start unit 111 selects the identifier information of data-to-be-pull-printed, and informs the pull-print data obtaining unit 112 of the identifier information.

The pull-print data obtaining unit 112 of the pull-print MFP 10A informs the server device 20 of the identifier information of the data-to-be-pull-printed and the pull-print resolution of the pull-print MFP 10A via the network N.

The pull-print accepting unit 210 of the server device 20 accepts a pull-print request from the pull-print MFP 10A via the network N, and thereby obtains the identifier information of the data-to-be-pull-printed and the pull-print resolution of the pull-print MFP 10A.

The resolution determining unit 211 of the server device 20 determines whether the resolution the same as the pull-print resolution is recorded in the resolution table 204 or not. Where the resolution determining unit 211 of determines that the resolution the same as the pull-print resolution is not recorded in the resolution table 204, the resolution determining unit 211 records the pull-print MFP 10 and the pull-print resolution in association with each other in the resolution table 204.

The pull-print data supplying unit 212 of the server device 20 supplies rasterized data or intermediate data depending on the resolution the same as the resolution of the pull-print MFP 10A to the pull-print MFP 10A via the network N.

The pull-print data obtaining unit 112 of the pull-print MFP 10A obtains the rasterized data or the intermediate data from the server device 20 via the network N.

The pull-print executing unit 113 of the pull-print MFP 10A outputs the rasterized data obtained from the server device 20 to the image forming device 16 for printing. Alternatively, the pull-print executing unit 113 causes the rasterized data generating unit 102 to generate rasterized data on a basis of the intermediate data obtained from the server device 20. The pull-print executing unit 113 outputs the rasterized data generated by the rasterized data generating unit 102 to the image forming device 16 for printing.

The table reset unit 213 of the server device 20 resets the resolution table 204 at specific timings, and deletes the information recorded in the resolution table 204.

6. OPERATION OF INFORMATION PROCESSING SYSTEM

Figure 5:
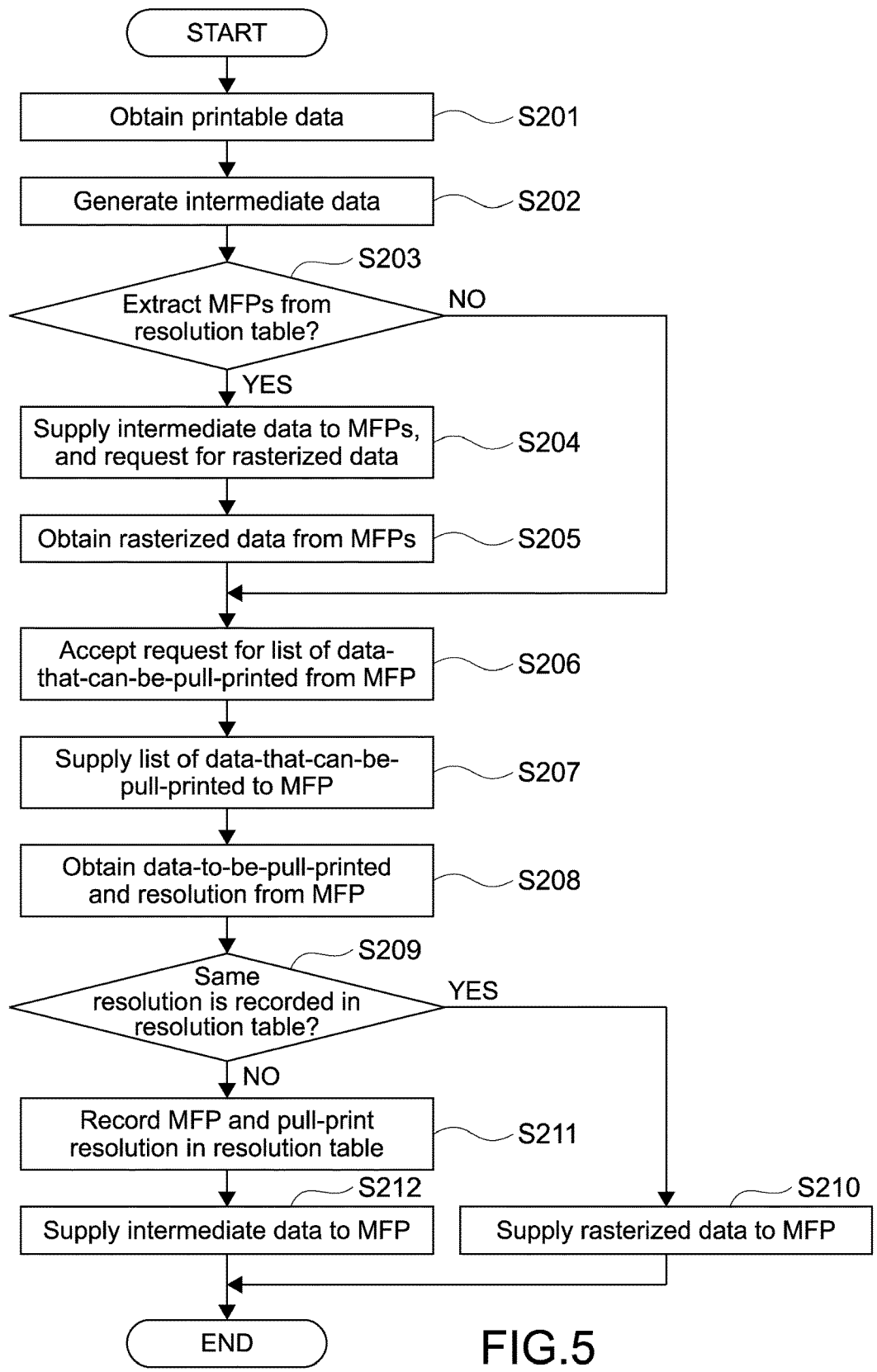
FIG. 5 shows an operational flow of the server device.
Figure 6:
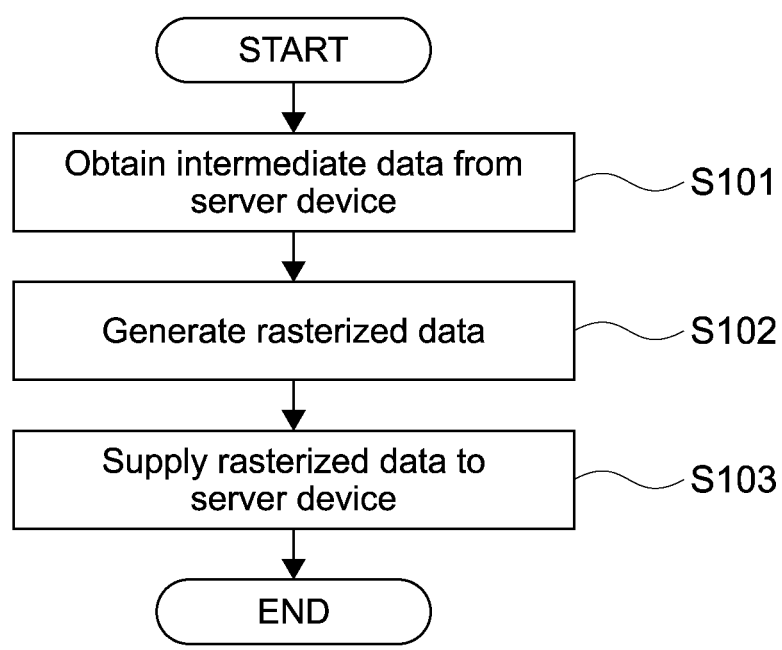
FIG. 6 shows an operational flow of the image forming apparatus.
Figure 7:
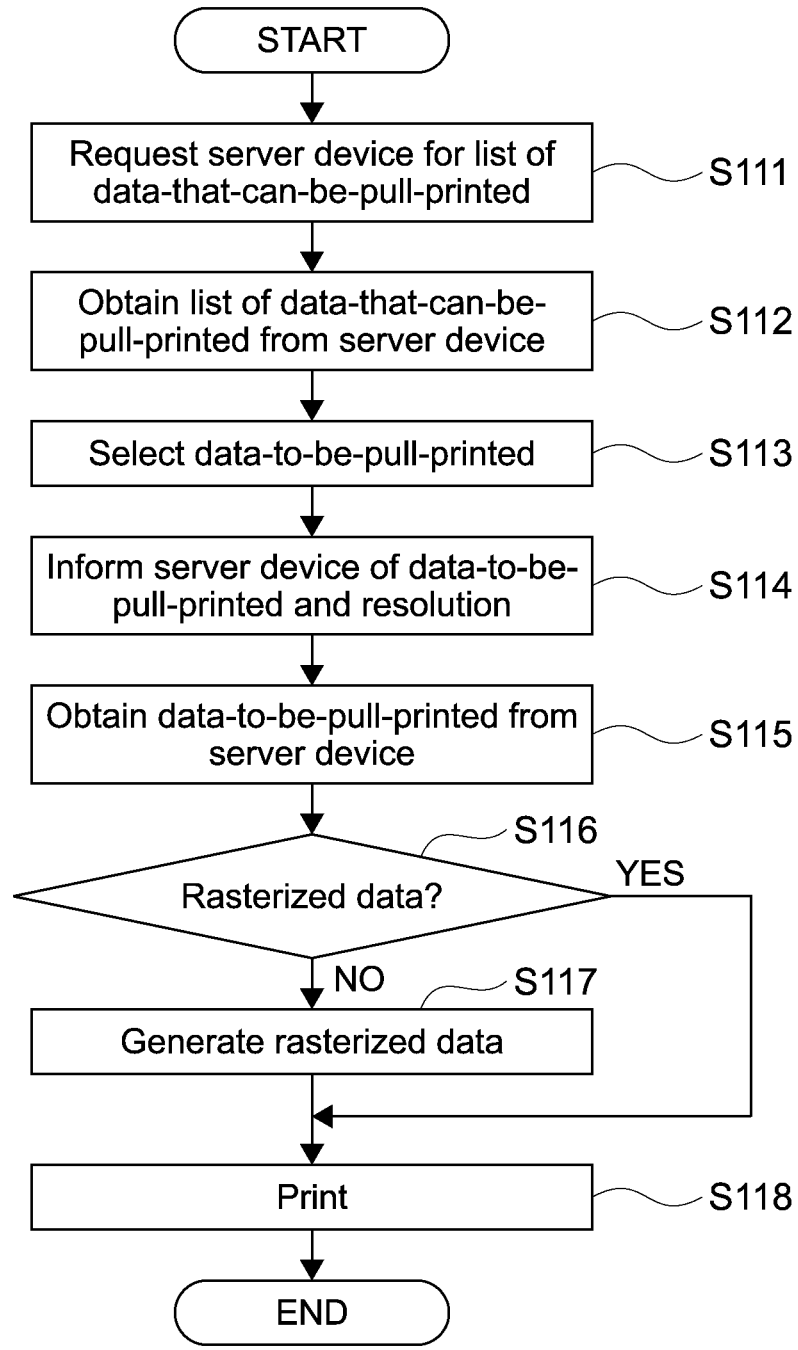
FIG. 7 shows an operational flow of the image forming apparatus for executing pull-print.
Figure 8:
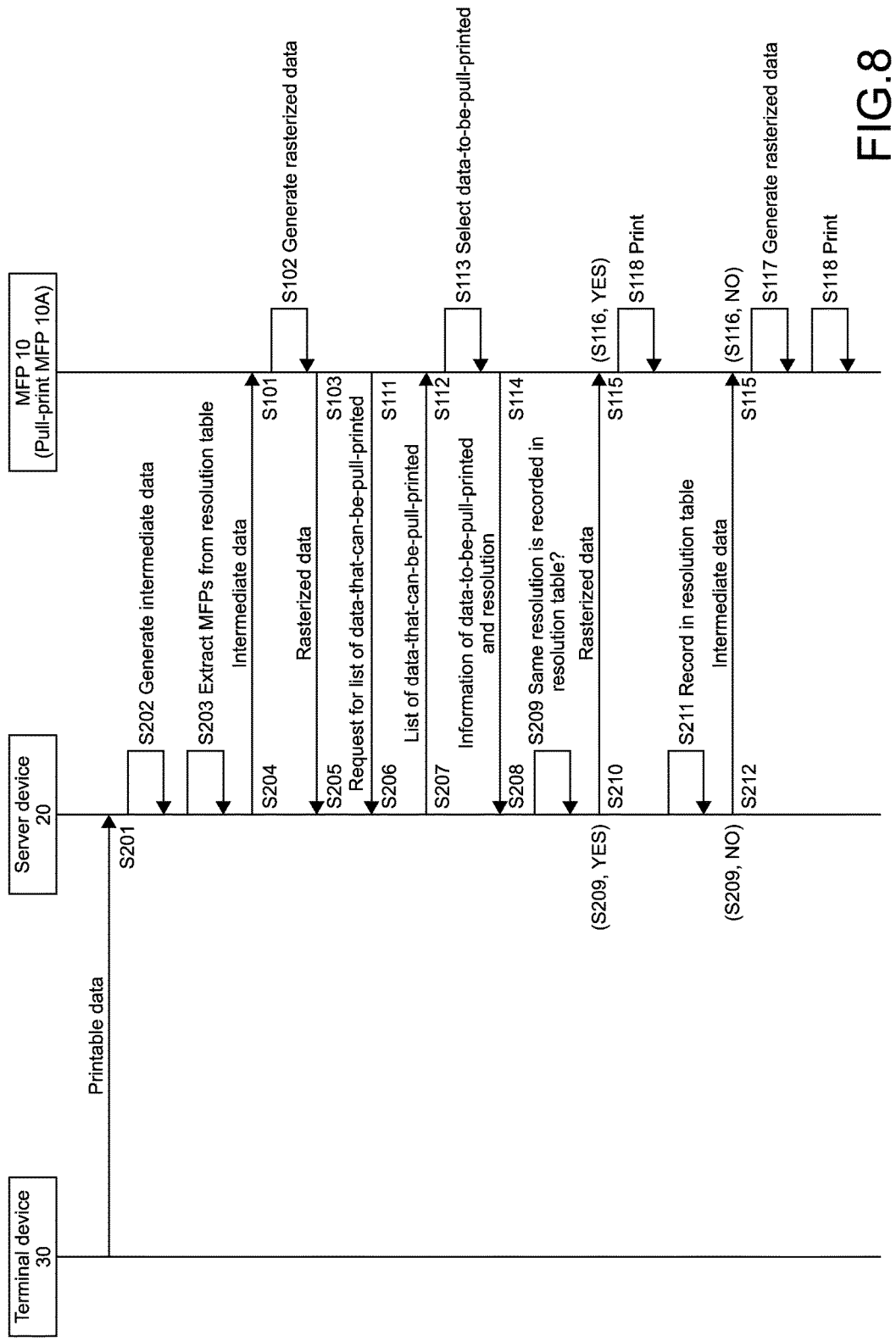
FIG. 8 shows an operational sequence of the information processing system.

FIG. 5 shows an operational flow of the server device. FIG. 6 shows an operational flow of the image forming apparatus. FIG. 7 shows an operational flow of the image forming apparatus for executing pull-print. FIG. 8 shows an operational sequence of the information processing system.

In this embodiment, each resolution has the following value.

Resolution of the MFP 10A: 600 dpi (dots per inch)
Resolution of the MFP 10B: 1200 dpi
Resolution described in printable data: 1200 dpi The terminal device 30 supplies printable data to the server device 20 via the network N on a basis of a specific operation input by a user. The printable data describes identifier information (name, etc.) of the printable data, and the resolution (1200 dpi) of printing the printable data.

The printable data obtaining unit 201 of the server device 20 obtains the printable data from the terminal device 30 via the network N (Step S201). The printable data obtaining unit 201 supplies the printable data obtained from the terminal device 30 to the intermediate data generating unit 202. The printable data obtaining unit 201 records the identifier information (name, etc.) of the printable data obtained from the terminal device 30 in the pull-print list memory area 208 as a list of data-that-can-be-pull-printed.

The intermediate data generating unit 202 of the server device 20 obtains the printable data from the printable data obtaining unit 201, and then interprets the obtained printable data and generates intermediate data independent of a resolution (Step S202). The intermediate data describes the resolution (1200 dpi) of printing the intermediate data. The intermediate data generating unit 202 records the generated intermediate data in the intermediate data memory area 206, and supplies the generated intermediate data to the intermediate data supplying unit 203.

By the way, the resolution table 204 of the server device 20 records the plurality of MFPs 10 (specifically, identifier information and address information (for example, IP address) of the plurality of MFPs 10) having different resolutions and the different resolutions in association with each other. The MFPs 10 recorded in the resolution table 204 are the MFPs 10 connected to the network N to which the server device 20 is connected. In this example, the resolution table 204 records the MFPs 10A and 10B having different resolutions and the different resolutions (600 dpi, 1200 dpi) in association with each other. In other words, the resolution table 204 records the one MFP 10 in association with one kind of resolution. For example, even if an MFP (not shown) of 600 dpi, which is different from the MFP 10A, is connected to the network N, the resolution table 204 records the one MFP 10A in association with the resolution 600 dpi. A method of recording the MFP 10 and its resolution in association with each other in the resolution table 204 will be described later (Step S211, described later).

Description will be made with reference to the operational flow again. The intermediate data supplying unit 203 of the server device 20 obtains the intermediate data from the intermediate data generating unit 202. The intermediate data supplying unit 203 extracts the MFPs 10A and 10B corresponding to all the identifier information recorded in the resolution table 204 (Step S203, YES). The intermediate data supplying unit 203 supplies the intermediate data to all the MFPs 10A and 10B (FIG. 4 and FIG. 8 show only one MFP) recorded in the resolution table 204 (i.e., to address information of the MFPs 10A and 10B recorded in the resolution table 204) via the network N, and requests to generate rasterized data on a basis of the intermediate data (Step S204).

In short, before the pull-print accepting unit 210 accepts a pull-print request from the pull-print MFP 10A (Step S208, described later), the intermediate data generating unit 202 generates the intermediate data (Step S202). Then, before the pull-print accepting unit 210 accepts a pull-print request from the pull-print MFP 10A (Step S208, described later), the intermediate data supplying unit 203 supplies the intermediate data to all the MFPs 10A and 10B recorded in the resolution table 204, and requests to generate rasterized data on a basis of the intermediate data (Step S204).

The intermediate data obtaining unit 101 of the MFP 10 obtains the intermediate data from the server device 20 via the network N, and receives the request to generate rasterized data on a basis of the intermediate data (Step S101). The intermediate data obtaining unit 101 supplies the obtained intermediate data to the rasterized data generating unit 102.

Where the rasterized data generating unit 102 of the MFP 10 obtains the intermediate data from the intermediate data obtaining unit 101, the rasterized data generating unit 102 generates rasterized data depending on the resolution of the MFP 10 on a basis of the obtained intermediate data (that describes resolution 1200 dpi) (Step S102). Specifically, the rasterized data generating unit 102 of the MFP 10A (resolution 600 dpi) generates rasterized data of 600 dpi on a basis of the intermediate data. The rasterized data generating unit 102 of the MFP 10B (resolution 1200 dpi) generates rasterized data of 1200 dpi on a basis of the intermediate data. Note that an MFP (not shown), whose resolution (for example, 2400 dpi) is higher than the resolution (1200 dpi) described in the intermediate data, may generate rasterized data of the resolution (1200 dpi) described in the intermediate data. The rasterized data generating unit 102 of the MFP 10 supplies the generated rasterized data to the rasterized data supplying unit 103.

The rasterized data supplying unit 103 of the MFP 10 supplies the rasterized data generated by the rasterized data generating unit 102 to the server device 20 via the network N (Step S103). Specifically, the rasterized data supplying unit 103 of the MFP 10A supplies the rasterized data of 600 dpi to the server device 20. The rasterized data supplying unit 103 of the MFP 10B supplies the rasterized data of 1200 dpi to the server device 20.

The rasterized data obtaining unit 205 of the server device 20 obtains the plurality of rasterized data depending on the resolutions of the MFPs 10A and 10B from all the MFPs 10A and 10B recorded in the resolution table 204 via the network N (Step S205). The rasterized data obtaining unit 205 records the rasterized data depending on the different resolutions obtained from the MFPs 10 in the rasterized data memory area 209. Specifically, the rasterized data obtaining unit 205 obtains the rasterized data of 600 dpi from the MFP 10A, and obtains the rasterized data of 1200 dpi from the MFP 10B. The rasterized data obtaining unit 205 records the rasterized data of 600 dpi obtained from the MFP 10A and the rasterized data of 1200 dpi obtained from the MFP 10B in the rasterized data memory area 209.

A user operates any one MFP 10 and logs in to the MFP 10 as an MFP that executes pull-print (pull-print MFP). In this example, the pull-print MFP is the MFP 10A of the pull-print resolution 600 dpi. Note that the pull-print MFP may be an MFP recorded in the resolution table 204 as in this example or may be an MFP not recorded in the resolution table 204, and it does not matter. When the pull-print MFP 10A detects a specific operation input in the operation device 17 by a user, the pull-print MFP 10A starts the pull-print process.

The pull-print start unit 111 of the pull-print MFP 10A requests (sends request signal) the server device 20 for a list of data-that-can-be-pull-printed via the network N (Step S111). Note that the request signal, which the pull-print start unit 111 of the pull-print MFP 10A sends to the server device 20 when requesting for a list of data-that-can-be-pull-printed, contains the identifier information and the address information (for example, IP address) of the pull-print MFP 10A.

The pull-print list supplying unit 207 of the server device 20 accepts the request (receives request signal) for a list of data-that-can-be-pull-printed from the pull-print MFP 10A via the network N (Step S206). The pull-print list supplying unit 207 retrieves the list of data-that-can-be-pull-printed from the pull-print list memory area 208. The pull-print list supplying unit 207 supplies the list of data-that-can-be-pull-printed to the pull-print MFP 10A (to address information contained in request signal from the pull-print MFP 10A) via the network N (Step S207).

The pull-print start unit 111 of the pull-print MFP 10A obtains the list of data-that-can-be-pull-printed from the server device 20 via the network N (Step S112). The pull-print start unit 111 displays the identifier information (name, etc.) of the data in the list of data-that-can-be-pull-printed on the display device 17a, for example, to present them to the user.

With reference to the identifier information (name, etc.) of the data-that-can-be-pull-printed displayed on the display device 17a, the user operates the operation device 17 to select identifier information of data-that-can-be-pull-printed.

The pull-print start unit 111 of the pull-print MFP 10A selects the identifier information of data-to-be-pull-printed on a basis of the specific operation input in the operation device 17 by the user (Step S113). The pull-print start unit 111 informs the pull-print data obtaining unit 112 of the identifier information of the selected data-to-be-pull-printed.

The pull-print data obtaining unit 112 of the pull-print MFP 10A obtains the identifier information of the data-to-be-pull-printed from the pull-print start unit 111. The pull-print data obtaining unit 112 informs the server device 20 of the identifier information of the data-to-be-pull-printed and the pull-print resolution (600 dpi) of the pull-print MFP 10A via the network N (Step S114).

The pull-print accepting unit 210 of the server device 20 accepts a pull-print request from the pull-print MFP 10A via the network N. Specifically, by accepting the pull-print request, the pull-print accepting unit 210 obtains the identifier information of the selected data-to-be-pull-printed and the pull-print resolution (600 dpi) of the pull-print MFP 10A (Step S208). The pull-print accepting unit 210 informs the resolution determining unit 211 of the pull-print resolution (600 dpi).

The resolution determining unit 211 of the server device 20 receives the information on the pull-print resolution (600 dpi) from the pull-print accepting unit 210. The resolution determining unit 211 determines whether the resolution the same as the pull-print resolution (600 dpi) is recorded in the plurality of different resolutions recorded in the resolution table 204 or not (Step S209). The resolution determining unit 211 informs the pull-print data supplying unit 212 of whether the resolution the same as the pull-print resolution (600 dpi) is recorded or not.

The fact that the resolution the same as the pull-print resolution is recorded in the resolution table 204 means that the rasterized data depending on the resolution the same as the pull-print resolution (Step S205) is recorded in the rasterized data memory area 209. Meanwhile, the fact that the resolution the same as the pull-print resolution is not recorded in the resolution table 204 means that the rasterized data depending on the resolution the same as the pull-print resolution (Step S205) is not recorded in the rasterized data memory area 209.

In this example, the resolution table 204 records the MFPs 10A and 10B having the different resolutions and the different resolutions (600 dpi, 1200 dpi) in association with each other. Therefore, the resolution determining unit 211 determines that the resolution the same as the pull-print resolution (600 dpi) is recorded in the plurality of different resolutions recorded in the resolution table 204 (Step S209, YES). The resolution determining unit 211 informs the pull-print data supplying unit 212 that it is determined that the resolution the same as the pull-print resolution is recorded in the resolution table 204.

The pull-print data supplying unit 212 of the server device 20 receives the information that the resolution the same as the pull-print resolution is recorded in the resolution table 204 from the resolution determining unit 211. Then, the pull-print data supplying unit 212 retrieves, from the rasterized data memory area 209, the rasterized data depending on the resolution the same as the resolution (600 dpi) of the pull-print MFP 10A for the data-to-be-printed corresponding to the identifier information obtained from the pull-print MFP 10A. The pull-print data supplying unit 212 supplies the retrieved rasterized data to the pull-print MFP 10A via the network N (Step S210).

The pull-print data obtaining unit 112 of the pull-print MFP 10A obtains the data-to-be-pull-printed from the server device 20 via the network N (Step S115). Where the pull-print data obtaining unit 112 obtains the rasterized data (Step S116, YES), the pull-print data obtaining unit 112 supplies the rasterized data to the pull-print executing unit 113. Specifically, the obtained data is the rasterized data depending on the resolution the same as the resolution (600 dpi) of the pull-print MFP 10A.

The pull-print executing unit 113 of the pull-print MFP 10A obtains the rasterized data from the pull-print data obtaining unit 112. The pull-print executing unit 113 outputs the obtained rasterized data to the image forming device 16 for printing (Step S118).

Meanwhile, the resolution determining unit 211 of the server device 20 determines that the resolution the same as the pull-print resolution is not recorded in the resolution table 204 (Step S209, NO). The resolution determining unit 211 informs the pull-print data supplying unit 212 that it is determined that the resolution the same as the pull-print resolution is not recorded in the resolution table 204. Further, the resolution determining unit 211 records the pull-print MFP 10A and the pull-print resolution in association with each other in the resolution table 204 (Step S211). Specifically, the resolution determining unit 211 records the identifier information and the address information (for example, IP address) of the pull-print MFP 10A and the pull-print resolution in association with each other in the resolution table 204. The request signal received by the pull-print list supplying unit 207 in Step S206 contains the identifier information and the address information of the pull-print MFP 10A.

The pull-print data supplying unit 212 of the server device 20 receives the information that the resolution the same as the pull-print resolution is not recorded in the resolution table 204 from the resolution determining unit 211. Then, the pull-print data supplying unit 212 retrieves, from the intermediate data memory area 206, the intermediate data for the data-to-be-printed corresponding to the identifier information obtained from the pull-print MFP 10A. The pull-print data supplying unit 212 supplies the retrieved intermediate data to the pull-print MFP 10A via the network N (Step S212).

The pull-print data obtaining unit 112 of the pull-print MFP 10A obtains the data-to-be-pull-printed from the server device 20 via the network N (Step S115). Where the pull-print data obtaining unit 112 obtains the intermediate data (Step S116, NO), the pull-print data obtaining unit 112 supplies the intermediate data to the pull-print executing unit 113.

The pull-print executing unit 113 of the pull-print MFP 10A obtains the intermediate data from the pull-print data obtaining unit 112. The pull-print executing unit 113 supplies the obtained intermediate data to the rasterized data generating unit 102.

The rasterized data generating unit 102 of the pull-print MFP 10A generates rasterized data depending on the resolution of the MFP 10A on a basis of the intermediate data obtained from the pull-print executing unit 113 (Step S117). The rasterized data generating unit 102 supplies the generated rasterized data to the pull-print executing unit 113.

The pull-print executing unit 113 of the pull-print MFP 10A obtains the rasterized data from the rasterized data generating unit 102. The pull-print executing unit 113 outputs the obtained rasterized data to the image forming device 16 for printing (Step S118).

Note that the table reset unit 213 of the server device 20 resets the resolution table 204 at specific timings, and deletes the information recorded in the resolution table 204. The "specific timings" mean, for example, regular timings, or timings based on specific triggers. As a result, the resolution table 204 is updated every specific timing. As a result, for example, where a high-spec MFP (resolution is the same as the resolution of any one MFP already connected) is newly connected to the network N, there is an opportunity to record the new MFP in the resolution table 204.

Where the resolution table 204 is reset and the information recorded in the resolution table 204 is deleted, the intermediate data supplying unit 203 cannot extract MFPs recorded in the resolution table 204 (Step S203, NO). In this case, the server device 20 stands by until the server device 20 accepts a request for a list of data-that-can-be-pull-printed from the pull-print MFP 10A via the network N (Step S206).

7. CONCLUSION

According to a typical pull-print technique, when pull-printing an image, an image forming apparatus obtains intermediate data from a server device, generates rasterized data based on the obtained intermediate data, and forms an image based on the generated rasterized data.

For example, according to one possible technique, an MFP prints an image based on original data independent of a resolution according to conditions. In this case, however, the MFP has to generate rasterized data depending on its resolution every time the MFP prints an image. Since it takes time to generate rasterized data, as a result, it takes time to form an image.

To the contrary, according to the aforementioned embodiment, before the server device 20 accepts a pull-print request from the pull-print MFP 10A (Step S208), the server device 20 generates the intermediate data (Step S202), supplies the intermediate data to all the MFPs 10A and 10B recorded in the resolution table 204, and requests to generate rasterized data on a basis of the intermediate data (Step S204). As a result, the server device 20 is highly likely to obtain the rasterized data depending on the resolution of the pull-print MFP 10A (Step S205) before the server device 20 accepts a pull-print request from the pull-print MFP 10A (Step S208).

As a result, the server device 20 can supply the rasterized data depending on the resolution of the pull-print MFP 10A to the pull-print MFP 10A (Step S210) immediately after accepting a pull-print request from the pull-print MFP 10A (Step S208). Therefore, since the pull-print MFP 10A only has to print the rasterized data obtained from the server device 20 (Step S118), the pull-print MFP 10A can skip the step of generating the rasterized data on a basis of the intermediate data that the MFP obtained from the server device. Therefore, according to this embodiment, it is possible to execute pull-print in a shorter period of time than a typical pull-print technique including the step of generating rasterized data on a basis of intermediate data that an MFP obtained from a server device.

Meanwhile, if the server device 20 does not obtain rasterized data depending on the resolution of the pull-print MFP 10A (Step S209, NO), all the server device 20 can do is to supply intermediate data to the pull-print MFP 10A (Step S212). However, the server device 20 records the pull-print MFP 10A and the pull-print resolution in association with each other in the resolution table 204 (Step S211). As a result, if the server device 20 accepts a pull-print request from an MFP, whose resolution is the same as the resolution of the pull-print MFP 10A, next time (Step S208), the server device 20 certainly obtains rasterized data generated by the pull-print MFP 10A (Step S205). Therefore, on and after the next time, the server device 20 can supply rasterized data depending on the pull-print resolution to a pull-print MFP (Step S210).

Further, according to another possible technique, a server obtains model information (production number) of an image forming apparatus, generates image data depending on the resolution based on the model information, and supplies the image data to the image forming apparatus. According to this technique, however, since the server manages model information and resolutions in relation with each other, the server has to always update model information every time new models are released.

To the contrary, according to the aforementioned embodiment, the server device 20 has the resolution table 204 that records a plurality of image forming apparatuses having different resolutions and the different resolutions in association with each other. Therefore, although the server device 20 stores no model information, the pull-print MFP 10 can appropriately obtain rasterized data depending on the pull-print resolution.

It should be understood by those skilled in the art that various modifications, combinations, sub-combinations and alterations may occur depending on design requirements and other factors insofar as they are within the scope of the appended claims or the equivalents thereof.

What is claimed is:

1. A server device, comprising:
  a storage that stores a resolution table, the resolution table recording a plurality of image forming apparatuses having different resolutions and the different resolutions in association with each other;
  a memory that stores an information processing program; and
  a processor that executes the information processing program, wherein
  when the processor executes the information processing program, the processor operates as
    a printable data obtaining unit that obtains printable data from a terminal device,
    an intermediate data generating unit that generates intermediate data on a basis of the printable data, the intermediate data being independent of a resolution,
    an intermediate data supplying unit that supplies the intermediate data to the plurality of image forming apparatuses recorded in the resolution table,
    a rasterized data obtaining unit that obtains a plurality of rasterized data depending on the different resolutions, the plurality of rasterized data being generated on a basis of the intermediate data by the plurality of image forming apparatuses,
    a pull-print accepting unit that accepts a pull-print request from a pull-print image forming apparatus and obtains a pull-print resolution, the pull-print image forming apparatus being an image forming apparatus that executes pull-print, the pull-print resolution being a resolution of the pull-print image forming apparatus,
    a resolution determining unit that determines whether a resolution same as the pull-print resolution is recorded in the resolution table or not, and
    a pull-print data supplying unit that supplies rasterized data to the pull-print image forming apparatus, the rasterized data depending on the resolution the same as the pull-print resolution, and wherein
  after the printable data obtaining unit obtains the printable data and before the pull-print accepting unit accepts the pull-print request,
    the intermediate data generating unit generates intermediate data on a basis of printable data, the intermediate data being independent of a resolution, and
    the intermediate data supplying unit supplies the intermediate data to the plurality of image forming apparatuses recorded in the resolution table.

2. The server device according to claim 1, wherein
  where the resolution determining unit determines that the resolution the same as the pull-print resolution is not recorded in the resolution table,
  the resolution determining unit records the pull-print image forming apparatus and the pull-print resolution in association with each other in the resolution table, and
  the pull-print data supplying unit supplies the intermediate data to the pull-print image forming apparatus.

3. The server device according to claim 2, wherein
  when the processor executes the information processing program, the processor operates as
  a table reset unit that resets the resolution table at a specific timing.

4. A non-transitory computer readable recording medium that records an information processing program, the information processing program causing a computer including
  a storage that stores a resolution table, the resolution table recording a plurality of image forming apparatuses having different resolutions and the different resolutions in association with each other,
  to operate as:
    a printable data obtaining unit that obtains printable data from a terminal device;

an intermediate data generating unit that generates intermediate data on a basis of the printable data, the intermediate data being independent of a resolution;

an intermediate data supplying unit that supplies the intermediate data to the plurality of image forming apparatuses recorded in the resolution table;

a rasterized data obtaining unit that obtains a plurality of rasterized data depending on the different resolutions, the plurality of rasterized data being generated on a basis of the intermediate data by the plurality of image forming apparatuses;

a pull-print accepting unit that accepts a pull-print request from a pull-print image forming apparatus and obtains a pull-print resolution, the pull-print image forming apparatus being an image forming apparatus that executes pull-print, the pull-print resolution being a resolution of the pull-print image forming apparatus;

a resolution determining unit that determines whether a resolution same as the pull-print resolution is recorded in the resolution table or not; and a pull-print data supplying unit that supplies rasterized data to the pull-print image forming apparatus, the rasterized data depending on the resolution the same as the pull-print resolution, wherein after the printable data obtaining unit obtains the printable data and before the pull-print accepting unit accepts the pull-print request, the intermediate data generating unit generates intermediate data on a basis of printable data, the intermediate data being independent of a resolution, and the intermediate data supplying unit supplies the intermediate data to the plurality of image forming apparatuses recorded in the resolution table.

5. An information processing system, comprising:

a plurality of image forming apparatuses having different resolutions; and a server device including a storage that stores a resolution table, the resolution table recording the plurality of image forming apparatuses and the different resolutions in association with each other, a memory that stores an information processing program, and a processor that executes the information processing program, wherein when the processor executes the information processing program, the processor operates as a printable data obtaining unit that obtains printable data from a terminal device, an intermediate data generating unit that generates intermediate data on a basis of the printable data, the intermediate data being independent of a resolution, an intermediate data supplying unit that supplies the intermediate data to the plurality of image forming apparatuses recorded in the resolution table, a rasterized data obtaining unit that obtains a plurality of rasterized data depending on the different resolutions, the plurality of rasterized data being generated on a basis of the intermediate data by the plurality of image forming apparatuses, a pull-print accepting unit that accepts a pull-print request from a pull-print image forming apparatus and obtains a pull-print resolution, the pull-print image forming apparatus being an image forming apparatus that executes pull-print, the pull-print resolution being a resolution of the pull-print image forming apparatus, a resolution determining unit that determines whether a resolution same as the pull-print resolution is recorded in the resolution table or not, and a pull-print data supplying unit that supplies rasterized data to the pull-print image forming apparatus, the rasterized data depending on the resolution the same as the pull-print resolution, and wherein after the printable data obtaining unit obtains the printable data and before the pull-print accepting unit accepts the pull-print request, the intermediate data generating unit generates intermediate data on a basis of printable data, the intermediate data being independent of a resolution, and the intermediate data supplying unit supplies the intermediate data to the plurality of image forming apparatuses recorded in the resolution table.

* * * * *